United States Patent
Reichert et al.

(10) Patent No.: US 6,900,594 B1
(45) Date of Patent: May 31, 2005

(54) METHODS AND A DEVICE FOR AUTOMATICALLY SWITCHING ON OR OFF THE ILLUMINATION OF A VEHICLE

(75) Inventors: Andreas Reichert, Sachsenheim (DE); Andreas Lägler, Brackenheim (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 393 days.

(21) Appl. No.: 10/130,982

(22) PCT Filed: Nov. 27, 2000

(86) PCT No.: PCT/EP00/11779
§ 371 (c)(1), (2), (4) Date: May 24, 2002

(87) PCT Pub. No.: WO01/40021
PCT Pub. Date: Jun. 7, 2001

(30) Foreign Application Priority Data

Nov. 27, 1999 (DE) .......................... 199 57 210

(51) Int. Cl.[7] .............................. B60Q 1/02
(52) U.S. Cl. ......................... 315/83; 315/82; 315/154; 340/426.25; 250/214 AL
(58) Field of Search ................ 315/76, 149, 79–83, 315/159, 154; 307/10.8, 10.1; 701/36, 49; 250/214 AL, 208.1; 340/815.4, 426.23–426.25

(56) References Cited

U.S. PATENT DOCUMENTS

| | | | | |
|---|---|---|---|---|
| 6,084,519 A | * | 7/2000 | Coulling et al. | 340/602 |
| 6,191,531 B1 | * | 2/2001 | Reime | 315/82 |
| 6,229,263 B1 | * | 5/2001 | Izawa | 315/80 |
| 6,392,218 B1 | * | 5/2002 | Kuehnle | 250/208.1 |
| 6,518,704 B1 | * | 2/2003 | Schuler | 315/82 |

FOREIGN PATENT DOCUMENTS

| | | |
|---|---|---|
| DE | 2264481 | 4/1974 |
| DE | 4324164 A1 | 1/1994 |
| DE | 19523262 | 1/1997 |
| DE | 19630216 C2 | 1/1998 |
| DE | 19821620 A1 | 11/1999 |
| JP | 59156841 | 9/1984 |

* cited by examiner

Primary Examiner—Haissa Philogene
(74) Attorney, Agent, or Firm—Young & Basile, P.C.

(57) ABSTRACT

A method and device for automatically switching on and/or off the illumination of a vehicle. Faulty switching is reduced by adapting the threshold value for switching on the illumination by averaging the measured brightness value(s) according to the driving speed and using switching-off conditions which, inter alia, consider the surrounding brightness.

30 Claims, 2 Drawing Sheets

METHODS AND A DEVICE FOR AUTOMATICALLY SWITCHING ON OR OFF THE ILLUMINATION OF A VEHICLE

BACKGROUND

The invention relates to methods or automatically switching on and switching off vehicle exterior lighting systems and devices.

As part of increasing safety and convenience in motor vehicles, vehicle functions are being automated to reduce the stress on the driver.

SUMMARY

The object of the invention is to make available methods of switching on and switching off the vehicle exterior lighting reliably and with a high degree of safety and thereby avoid unnecessary switching actions. This object is achieved under the invention by a method in which the average brightness $H_{amb}$ in the environment of the vehicle is determined and the vehicle exterior lighting is switched on when brightness $H_{amb}$ during a time period $T_{min,Night}$ is less than or equal to the threshold value $S_{Night}$.

This method has the advantage that damping of the input signal occurs because of the time interval.

Variations of the invention envision that a time-averaged brightness $H_{amb,m}(t+\Delta t)$ is created, in accordance with the formula $H_{amb,m}(t+\Delta t)=H_{amb,m}(t)*(1-a)+H_{amb}(t)*a$, with $0<a<1$ or the formula $H_{amb,m}(t+\Delta t)=H_{amb,m}(t)*(1-av)+H_{amb}(t)*av$, with $0<a<1$, and/or that the vehicle exterior lighting is switched on when brightness $H_{amb,m}(t+\Delta t)$ is less than or equal to the lower threshold value $S_{Night}$, so that unnecessary switching is avoided by means of averaging without suppressing instantaneous brightness. By exponentially averaging the brightness value, an accurate determination of brightness is made in spite of a possibly restricted angle of view of the brightness sensor or sensors. Moreover, at high vehicle speeds v the influence of the current brightness value increases compared with the averaged brightness value, so that particularly at high speeds the system can react to a tunnel entrance in a timely manner.

In one embodiment of the inventive method at least one brightness value $H_{v,1} \ldots H_{v,n}$ is determined in the direction of vehicle travel, and the vehicle exterior lighting is switched on when brightness $H_{amb}$ or $H_{amb,m}$ and at least one of the brightness values $H_{v,1} \ldots H_{v,n}$ is below a threshold value $S_{Night}$ during a time interval $T_{min,Night}$ so that the brightness in the direction of vehicle travel is taken into consideration appropriately.

Supplemental to the invention at least one brightness value $H_{v,1} \ldots H_{v,n}$ is determined in the direction of vehicle travel and the vehicle exterior lighting is switched on when at least one of the brightness values $H_{v,1} \ldots H_{v,n}$ is below a threshold value $S_{Tunnel}$, so that the entrance to a tunnel is detected in a timely manner and the vehicle exterior lighting can be switched on.

In additional variants of the inventive method it is envisioned that the threshold value $S_{Tunnel}$ increases with increasing ambient brightness $H_{amb}$, that the threshold value $S_{Tunnel}$ increases with increasing vehicle speed v, and/or that the steering angle of the steered wheels on the vehicle is determined, and that the threshold value $S_{Tunnel}$ increases with increasing steering angle, so that early and consistent recognition of tunnels under different conditions of ambient brightness is possible by adapting the threshold values. The threshold value can be further adapted by means of the sequence in which the brightness conditions determined fall off. In the case of several forward facing brightness sensors, the brightness value determined by the brightness sensor with the smallest aperture angle falls off the most quickly. In addition, dependable recognition of tunnels is ensured even on a winding road.

Other embodiments envision that the vehicle exterior lighting is switched on when the vehicle windshield wipers are switched on at least during a time period $T_{min,Rain}$ and/or that the threshold value $S_{Night}$ is increased and the time period $T_{min,Night}$ is reduced when the vehicle windshield wipers are switched on at least during the time period $T_{min,Rain}$ so that the vehicle can be seen better by other road users in rain, and the conditions for switching on the lights are changed during rainy weather toward switching the vehicle exterior lighting on at an early time.

This method has the advantage that the location at which the vehicle exterior lighting is switched on is not shifted toward the tunnel entrance with greater ambient brightness. Moreover, by considering vehicle speed when setting the lower threshold value $S_{Tunnel}$ the possibility is precluded that at a traffic signal, for example, a truck standing in front of the moving vehicle reduces ambient brightness in the direction of vehicle travel so severely that a tunnel is detected erroneously. Finally, by adapting the lower threshold value depending on ambient brightness, false detections of a tunnel under low ambient brightness are markedly reduced.

Supplemental to the invention, the vehicle exterior lighting is switched on when the brightness values determined $H_{amb}$, $H_{amb,m}$ and/or $H_{v,1} \ldots H_{v,n}$ are subject to severe fluctuations and they fall below a threshold value $S_{Forest}$, so that the vehicle exterior lighting is activated as required when driving through a forest. Further supplemental to the invention it is envisioned that the threshold value $S_{Forest}$ increases with increasing ambient brightness $H_{amb}$ so that adaptation to the particular situation is possible.

Another embodiment of the invention envisions determining the average brightness $H_{amb}$ in the vehicle environment when it is started up and switching on the vehicle exterior lighting when brightness $H_{amb}$ is less than or equal to the threshold value $S_{Garage}$, so that when the vehicle is started up in a garage its exterior lighting is switched on automatically. The method for automatically switching off the lighting of a vehicle includes:

the average brightness $H_{amb}$ is determined in the vehicle environment, the vehicle exterior lighting is switched off when brightness $H_{amb}$ is greater than or equal to the threshold value $S_{Day}$ during a time period $T_{min,Day}$ so that a certain time lag is a given with respect to the previous switching off of the lighting. This ensures that the vehicle exterior lighting is not switched off, for example, until after the vehicle has left the tunnel.

Supplemental to the invention, it is envisioned that a time-averaged brightness $H_{amb,m}(t+\Delta t)$ is created in accordance with the formula $H_{amb,m}(t+\Delta t)=H_{amb,m}(t)*(1-a)+H_{amb}(t)*a$, with $0<a<1$, and that the vehicle lighting is switched off when brightness $H_{amb,m}(t+\Delta t)$ is greater than or equal to the threshold value $S_{Day}$. Alternatively, it is envisioned that the speed v of the vehicle is determined, that a time-averaged brightness $H_{amb,m}(t+\Delta t)$ is created in accordance with the formula $H_{amb,m}(t+\Delta t)=H_{amb,m}(t)*(1-av)+H_{amb}(t)av$, with $0<a<1$, and that the vehicle lighting is switched off when brightness $H_{amb,m}(t+\Delta t)$ is greater than or equal to the threshold value $S_{Day}$, so that the aforementioned advantages of averaging come into play when switching off the lighting.

Supplemental to the invention, at least one brightness value $H_{v,1} \ldots H_{v,n}$ is determined in the direction of vehicle travel and the vehicle lighting is switched off if brightness $H_{amb}$ or $H_{amb,m}$ and at least one of the brightness values $H_{v,1} \ldots H_{v,n}$ during a time period $T_{min,Day}$ is greater than or equal to the threshold value $S_{Tunnel,off}$ is detected so that the exit from a tunnel can be detected in a timely manner and the vehicle lighting can be switched off.

Further supplemental to the invention, it is envisioned that the vehicle lighting is switched off when the vehicle windshield wipers are switched off during at least a period $T_{min,Rain}$ and the ambient brightness $H_{amb}$ is greater than or equal to the threshold value $S_{Day}$, so that the lighting does not remain switched on for an unnecessarily long time.

Another supplement to the invention envisions that the vehicle lighting is switched off when brightness $H_{amb}$ for the duration of a time period $T_{min,Garage}$ is greater than or equal to the threshold value $S_{Garage}$ and vehicle speed is greater than or equal to a minimum speed $V_{min}$, so that after leaving the garage the lighting can be switched off as required.

Further embodiments of the invention relate to the combination of methods for switching on and switching off the lighting, so that their advantages are mutually complementary.

The object stated above is accomplished under the invention by a device for automatically switching on or switching off the lighting of a vehicle having a first light sensor which determines the brightness ahead of, or around, the vehicle, having a second light sensor which determines the brightness in the direction in which the vehicle is traveling, where the first light sensor determines the average brightness $H_1$ of the light beams entering inside a spot with a large cone angle, where the second light sensor determines the average brightness $H_2$ of the light beams entering inside a spot with a small cone angle, where the longitudinal axis of the second spot runs basically horizontal and the longitudinal axis of the first spot rises relative to the horizontal, where a third light sensor is present which determines the average brightness $H_3$ of the light beams entering within a spot with a smaller cone angle than the second light sensor and where the longitudinal axes of the second and third spots run coaxially.

This device has the advantage that an additional brightness value is determined which is indispensable for safely switching on and switching off the vehicle exterior lighting, so that on one hand it is possible to detect a tunnel entrance from a great distance, on the other hand the possibility of incidents of the lighting being switched on unnecessarily, caused, for example, by a truck driving in front is reduced. Moreover, a distinction can reliably be made between a tunnel and bridge which will be passed under. Finally, the first light sensor allows twilight or dawn to be detected and can confirm that the vehicle is in a tunnel. Moreover, the reliability of tunnel detection is further increased by two light sensors which can be evaluated independently of each other.

In accordance with an advantageous embodiment of the invention, the cone angle of the first spot is greater than 40° so that an adequately large amount of the ambient light is included to determine the brightness value $H_1$. Nevertheless a certain discrimination of the ambient light is undertaken to determine the brightness $H_1$.

In accordance with a further advantageous embodiment of the invention, the cone angle of the second spot is less than 20°, specifically 15° and/or the cone angle of the third spot is less than 6°, specifically 5°, so that a targeted, almost punctiform determination of the brightness values $H_2$ and/or $H_3$ is achieved. In a further embodiment of the invention, the longitudinal axes of the first and the second spot run parallel so that the light sensors can be positioned parallel to each other.

The object stated above is also accomplished with a vehicle having an inventive device in which the longitudinal axes of the second and third spots run in the direction of the vehicle longitudinal axis, and in which the longitudinal axis of the first spot in plan view runs in the direction of the vehicle longitudinal axis.

This vehicle has the advantage that the device under the invention can be mounted solidly to the vehicle, and thus high fail-safe reliability is ensured.

In accordance with a further advantageous embodiment of the invention, the longitudinal axes of the second and third spots run in the direction of vehicle travel and the longitudinal axis of the first spot in plan view runs in the direction of travel, so that brightness is determined in the direction of travel, which is of advantage on a winding road, specifically when a tunnel entrance or a tunnel exit lies in a curve.

Another version envisions that the longitudinal axes of the second and third spots run in the rolling direction of the steered wheels and that the longitudinal axis of the first spot in plan view runs in the rolling direction of the steered wheels so that the tracking by the inventive device during vehicle changes of direction is made possible simply and economically.

In accordance with a further advantageous embodiment of the invention, the longitudinal axes of the first, second and third spots are freely selectable, so that it is possible to adapt the device, for example, to different load conditions or asymmetrical vehicles.

Further advantages and advantageous embodiments of the invention can be found in the following description, the drawing and claims.

BRIEF DESCRIPTION OF THE DRAWING

One embodiment of the subject of the invention is shown in the drawing and described in greater detail below. In the drawing.

DETAILED DESCRIPTION

Figure 1:
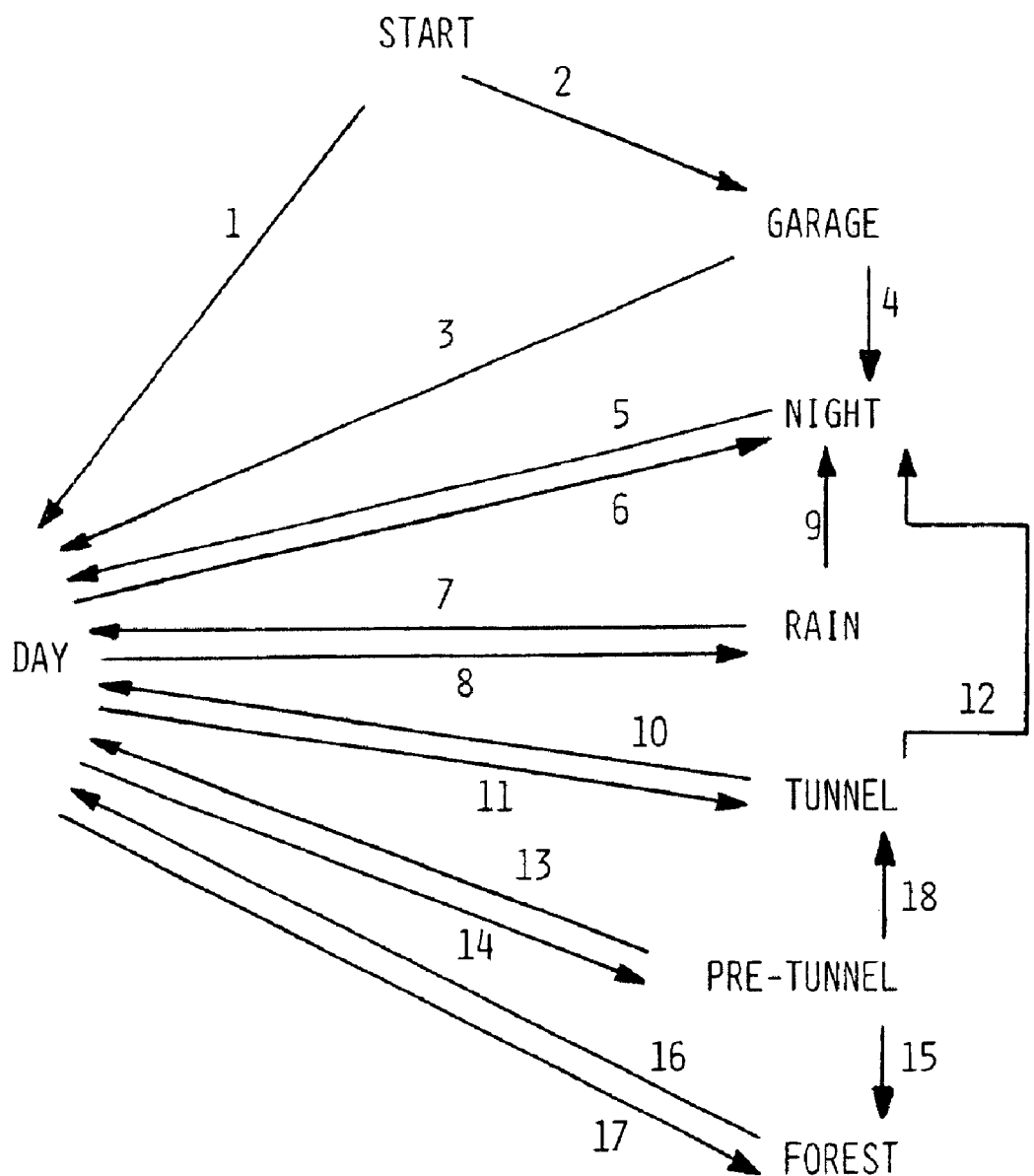
FIG. 1 depicts a graphic visualization of an inventive method.

In FIG. 1 the different operating modes, hereafter described as "mode", and the possible changes between these modes are depicted. In the "Day" mode, the vehicle exterior lighting is switched off, while it is switched on in the "Garage," "Night," "Rain," "Tunnel," "Pre-tunnel" and "Forest" modes.

The "Start" mode occupies a special place. When the vehicle is started the system is in the "Start" mode and, depending on the ambient brightness determined, shifts into the "Day" or "Garage" mode. These changes of mode are indicated in FIG. 1 by the arrows with the numbers 2 and 1. In the following chart the input parameters, threshold values and time constants are listed. The threshold value S represents a limit value for brightness in lux. The interval T determines the length of time during which the input parameters have to lie above or below the threshold value S, or if necessary, road speed v, in order to initiate a change of mode. Road speed v is the speed of the vehicle whose lighting is switched on or off.

The light sensors whose brightness values are compared with the threshold value S are listed in the "Spot" column.

A first light sensor is identified by A, which determines the ambient brightness $H_{amb}$. Light sensors oriented in the direction of travel of the vehicle are identified by "B" and "C". The aperture angle of spot B is greater than that of spot C and smaller than that of spot A.

In the case of changes of modes 7 and 8 it is only a matter of whether it is raining or not. If it rains for longer than 50 seconds, which is detected from the windshield wipers being switched on or a corresponding signal from a rain sensor, the lighting is switched on (mode change 8). The change back to the day mode (mode change 7) and the associated switching off of the lighting takes place when the windshield wipers are switched off for longer than 50 seconds or the rain sensor detects no rain for longer than 50 seconds.

In the case of mode change 12, the switch from "Tunnel" mode to "Night" mode takes place after the time constant "In-tunnel-time" has expired.

Many threshold values are adaptively modified depending on the brightness values determined and/or road speed v. For this reason no fixed threshold value S is given in column 2 in these cases.

TABLE

| Mode change | Threshold value S [lx] | Interval T [s] | Road speed v [kph] | Spot | Lighting |
|---|---|---|---|---|---|
| 1 | >3000 | 0 | — | A, B | "Off" |
| 2 | <3000 | 0 | — | A | |
| 3 | >3000 | >25 | >35 | A, B | "Off" |
| 4 | <3000 | >25 | >35 | A, B | "On" |
| 5 | >8000 | >120 | — | A | "Off" |
| 6 | <2500 | >50 | — | A, B | "On" |
| 7 | — | >50 | — | Wipers "off" | "Off" |
| 8 | — | >50 | — | Wipers "on" | "On" |
| 9 | <2500 | 0 | — | A | "On" |
| 10 | >8000 | >20 | — | A, B | "Off" |
| 11 | > Tunnel threshold value | — | — | A, B | "On" |
| 12 | | > "In-tunnel-time" | — | — | |
| 13 | >8000 | >20 | — | A, B | "Off" |
| 14 | < Adaptive threshold value | 0 | — | B, C | "On" |
| 15 | Adaptive "Forest" threshold value, spot A strong signal change | — | — | A, B, C | "On" |
| 16 | >8000 | >30 | — | A, B | "Off" |
| 17 | Adaptive "Forest" threshold value, spot A strong signal change | — | — | A, B, C | "On" |
| 18 | < Tunnel threshold value | — | — | A, B | "On" |

Several mode changes are described below as examples. The other mode changes can be derived in an analogous way from the table. Beginning with the start mode, the system goes into garage mode (mode change 2) when spot A determines a brightness of less than 3000 lx in the environment of the vehicle equipped with an inventive method of switching on the vehicle lighting. In this case the vehicle exterior lighting is switched on.

If the brightness in the environment of the vehicle at the time of start-up is greater than 3000 lx, as measured by spots A and B, the vehicle lighting is not switched on and the system shifts into day mode (mode change 1). The system can also shift from garage mode into day mode (mode change 3), if the speed of the vehicle is greater than 35 kph and spots A and B determine a brightness of more than 3000 lx during a time interval T of more than 25 seconds. The system goes from garage mode into a night mode (mode change 4), if the speed of the vehicle is greater than 35 kph and the brightness determined by spots A and B is less than 3000 lx for more than 25 seconds.

The change from day to night mode (mode change 6) takes place when spots A and B determine a brightness of less than 2000 lx for a duration of more than 120 seconds. Conversely, the system changes from night to day mode (mode change 5) when the exponential average of the brightness determined by spot A is greater than 8000 lx for more than 120 seconds.

The system can shift from day mode to a forest mode (mode change 7), if spot A identifies strong changes in the signal and the exponential average of spots A, B and C is less than an adaptive forest threshold value. The change from forest mode to day mode takes place (mode change 16), if spots A and B determine brightness of more than 8000 lx for a period T of more than 30 seconds. By recognizing strong changes in the signal from spot A, which is caused by the tops of the trees in the forest, the vehicle lighting is reliably switched on in the forest as well and thus increases the visibility of the vehicle for other road users.

The brightness values for spots A, B and C can be momentary values or "exponential averages" in accordance with the formulae for calculation given in the introductory description.

Figure 2:
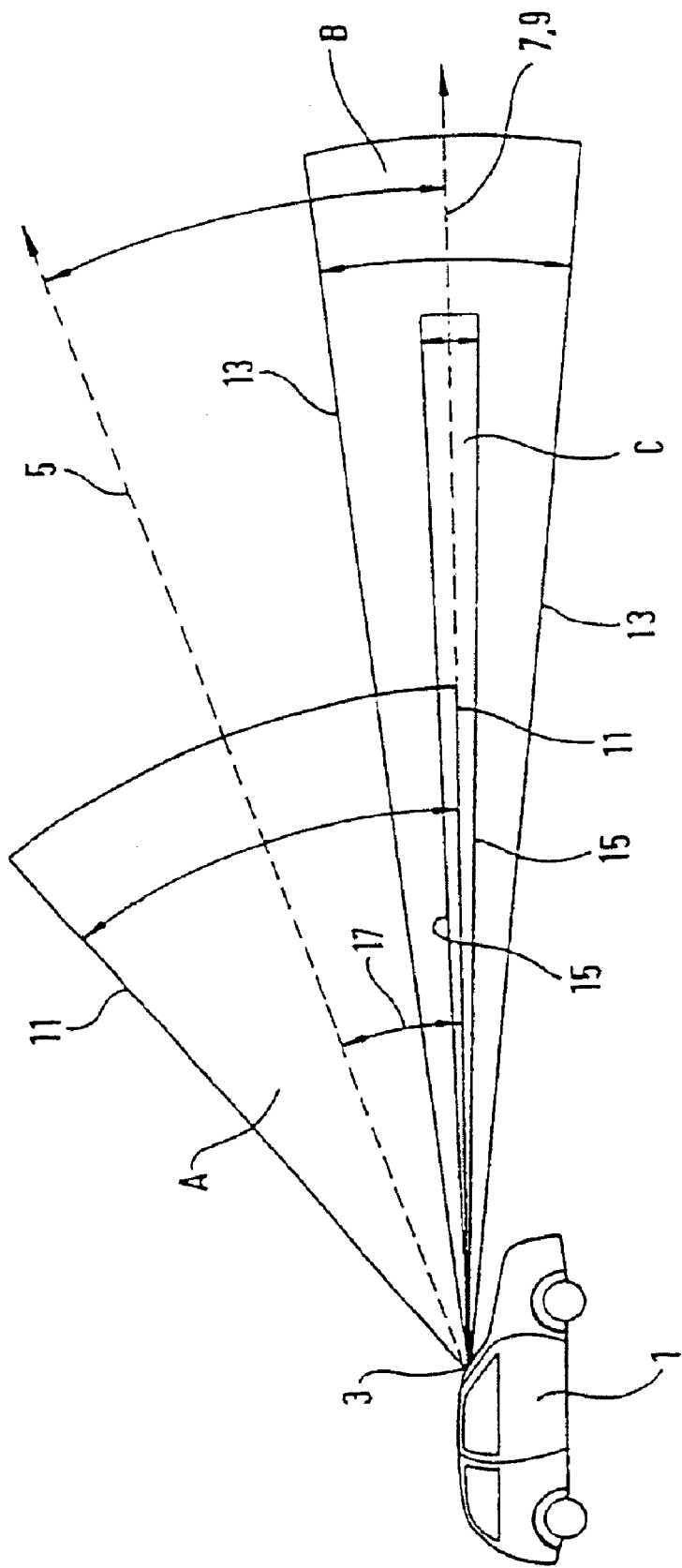
FIG. 2 depicts a vehicle equipped with an inventive device.

FIG. 2 shows a vehicle 1 equipped with an inventive device. An inventive device 3, which is not shown in detail, for automatically switching the vehicle exterior lighting on and off is installed in the area of the windshield of the vehicle 1. Furthermore, three spots A, B and C are shown, inside which three light sensors in the device 3 determine brightness. These spots A, B and C are each identified by a longitudinal axis 5, 7 and 9, and by the surface lines 11, 13 and 15 of the first spot A, of the second spot B and of the third spot C. It is easily conceivable that the brightness of a point is determined, instead of the spots within which the brightness of the light sensors is determined. In this case the cone angle is 0°.

The angle between the longitudinal axis 5 of the first spot A and the horizontal is identified by 17. The longitudinal axes of the second and third spots B and C run in the direction of the horizontal in this embodiment.

All the features shown in the description, the drawing and the following patent claims can be fundamental to the invention both individually and in any combination with each other.

What is claimed is:

1. A method for automatically switching on the lighting of a vehicle, comprising the steps of:
   determining an average brightness $H_{amb}$ in the environment of the vehicle; and
   switching the vehicle exterior lighting on, if brightness $H_{amb}$ is less than or equal to a threshold value $S_{Night}$ during a time interval $T_{min,Night}$.

2. The method in accordance with claim 1 further comprising the steps of:
   creating a time-averaged brightness $H_{amb,m}(t+t\Delta)$ according to the formula $H_{amb,m}(t+t\times)=H_{amb,m}(t)*(1-a)+H_{amb}(t)*a$, with $0<a<1$, wherein $H_{amb}(t)$ is the instantaneous average brightness at time t and $H_{amb,m}(t)$ is the average brightness over time at time t; and
   switching on the vehicle exterior lighting when the time-averaged brightness $H_{amb,m}(t+t\Delta)$ is less than or equal to a lower threshold value $S_{Night}$.

3. The method in accordance with claim 1 further comprising the steps of:
   determining the road speed v of the vehicle;
   creating a time-averaged brightness $H_{amb,m}(t+t\Delta)$ according to the formula $H_{amb,m}(t+t\Delta)=H_{amb,m}(t)*(1-a)+H_{amb}(t)*av$, with $0<a<1$, wherein $H_{amb}(t)$ is the instantaneous average brightness at time t and $H_{amb,m}(t)$ is the average brightness over time at time t; and
   switching on the vehicle exterior lighting when the time-averaged brightness $H_{amb,m}(t+t\Delta)$ is less than or equal to a lower threshold value $S_{Night}$.

4. The method in accordance with claim 1 further comprising the steps of:
   determining at least one brightness value $H_{v,1} \ldots H_{v,n}$ in a direction of travel of the vehicle; and
   switching on the vehicle exterior lighting when brightness $H_{amb}$ or $H_{amb,m}$ and the at least one brightness value $H_{v,1} \ldots H_{v,n}$ is less than or equal to the threshold value $A_{Night}$ during a time interval $T_{min,Night}$.

5. The method in accordance with claim 1 further comprising the steps of:
   determining at least one brightness value $H_{v,1} \ldots H_{v,n}$ in a direction of travel of the vehicle; and
   switching on the vehicle exterior lighting when at least one of the brightness values $H_{v,1} \ldots H_{v,n}$ lies below a threshold value $S_{Tunnel}$.

6. The method in accordance with claim 5, further comprising the step of:
   increasing the threshold value $S_{Tunnel}$ with increasing ambient brightness $H_{amb}$.

7. The method in accordance with claim 5, further comprising the step of:
   increasing the threshold value $S_{Tunnel}$ with increasing road speed v of the vehicle.

8. The method in accordance with claim 5, further comprising the steps of:
   determining the steering angle of the steered wheels of the vehicle; and
   increasing the threshold value $S_{Tunnel}$ with increasing steering angle.

9. The method in accordance with claim 1, further comprising the steps of:
   switching on the vehicle exterior lighting when the vehicle windshield wipers are switched on at least during a time interval $T_{min,Rain}$.

10. The method in accordance with claim 9 further comprising the steps of:
    setting the threshold value $S_{Night}$ higher and reducing the time interval $T_{min,Rain}$ when the vehicle windshield wipers are switched on at least during the time interval $T_{min,Rain}$.

11. The method in accordance with claim 1, further comprising the steps of:
    determining at least one brightness value $H_{v,1} \ldots H_{v,n}$ in a direction of travel of the vehicle; and
    switching the vehicle lighting on when at least one brightness value $H_{amb}$, $H_{amb,m}$ and $H_{v,1} \ldots H_{v,n}$ is subject to severe fluctuations and falls below a threshold value $S_{Forest}$.

12. The method in accordance with claim 11 further comprising the step of:
    increasing the threshold value $S_{Forest}$ with increasing ambient brightness $H_{amb}$.

13. The method in accordance with claim 1 further comprising the steps of:
    determining the average brightness $H_{amb}$ in the vehicle environment when the vehicle is started; and
    switching on the vehicle exterior lighting, when the brightness $H_{amb}$ is less than or equal to a threshold value $S_{Garage}$.

14. A method for automatically switching off the lighting of a vehicle, characterized by the steps of:
    determining an average brightness $H_{amb}$ in the environment of the vehicle; and
    switching the vehicle exterior lighting off, when the brightness $H_{amb}$ is greater than or equal to a threshold value $S_{Day}$ during a time interval $T_{min, Day}$.

15. The method in accordance with claim 14 further comprising the steps of:
    creating a time-averaged brightness $H_{amb}(t+t\Delta)$ according to the formula $H_{amb,m}(t+t\Delta)=H_{amb,m}(t)*(1-a)+H_{amb}(t)*a$, with $0<a<1$, wherein $H_{amb}(t)$ is the instantaneous average brightness at time t and $H_{amb,m}$ is the average brightness over time at time t; and
    switching the vehicle exterior lighting off when the time-averaged brightness $H_{amb,m}(t+t\Delta)$ is greater than or equal to the threshold value $S_{Day}$.

16. The method in accordance with claim 14 further comprising the steps of:
    determining a road speed v of the vehicle;
    creating a time-averaged brightness $H_{amb,m}(t+t\Delta)$ according to the formula $H_{amb,m}(t+t\Delta)=H_{amb,m}(t)*(1-av)+H_{amb}(t)*av$, with $0<a<1$, wherein $H_{amb}(t)$ is the instantaneous average brightness at time t and $H_{amb,m}(t)$ is the average brightness over time at time t; and
    switching off the vehicle exterior lighting when the time-averaged brightness $H_{amb,m}$ $(t+t\Delta)$ is greater than or equal to the threshold value $S_{Day}$.

17. The method in accordance with claim 14 further comprising the steps of:
    determining at least one brightness value $H_{v1} \ldots H_{v,n}$ in the direction of travel of the vehicle; and
    switching the vehicle exterior lighting off when the brightness $H_{amb}$ and the at least one brightness value $H_{v1} \ldots H_{v,n}$ during a time interval $T_{min,Day}$ are greater than or equal to a threshold value $S_{Tunnel}$.

18. The method in accordance with claim 14, further comprising the steps of:
    switching the vehicle exterior lighting off when the vehicle windshield wipers are switched off during a time interval $T_{min,Rain}$ and the ambient brightness $H_{amb}$ is greater than or equal to the threshold value $S_{Day}$.

19. The method in accordance with claim 14, further comprising the steps of:
    switching the vehicle exterior lighting off, when, after the vehicle is started, the brightness $H_{amb}$ for the duration of a time interval $T_{min,Garage}$ is greater than or equal to threshold value $S_{Garage}$ and a speed of the vehicle is greater than or equal to a minimum speed $v_{min}$.

20. A device for automatically switching on or switching off the exterior lighting of a vehicle comprising:
    a first light sensor determining brightness over a large area ahead of the vehicle;
    a second light sensor determining brightness in the direction of travel;
    the first light sensor determining the brightness $H_1$ of incident light beams entering inside a first spot with a large cone angle;
    the second light sensor determining the brightness $H_2$ of the light beams entering within a second spot with a small cone angle;

the wherein longitudinal axis of the second spot extends horizontally and the wherein longitudinal axis of the first spot rises with respect to the horizontal;

a third light sensor determining the brightness $H_3$ of the light beams entering within a spot with a smaller cone angle than the second light sensor;

the wherein longitudinal axes of the second and third spots run coaxially; and a light control unit responsive to signals from the first, the second and the third light sensors for automatically switching on and off the exterior lighting of the vehicle.

21. A vehicle having a device in accordance with claim 20, wherein the longitudinal axes of the second and third spots run in the direction of a longitudinal axis of the vehicle and the longitudinal axis of the first spot runs in the direction of the longitudinal axis of the vehicle.

22. The device in accordance with claim 20, wherein the cone angle of the first spot is greater than 40°.

23. The device in accordance with claim 20, wherein the cone angle of the second spot is less than 20°.

24. The device in accordance with claim 20, wherein the cone angle of the second spot is 15°.

25. The device in accordance with claim 20, wherein the cone angle of the third spot is less than 6°.

26. The device in accordance with claim 20, wherein the cone angle of the third spot is 5°.

27. The device in accordance with claim 20, wherein the longitudinal axes of the second and the third spots run parallel.

28. The vehicle having a device in accordance with claim 21, wherein the longitudinal axes of the first, second and third spots are freely selectable.

29. The vehicle having a device in accordance with claim 21, wherein the longitudinal axes of the second and third spots run in the direction of travel of the vehicle, and the longitudinal axis of the first spot in plan runs in the direction of travel.

30. The vehicle having a device in accordance with claim 21, wherein the longitudinal axes of the second and third spots run in the rolling direction of steered wheels of the vehicle, and in plan the longitudinal axis of the first spot runs in the rolling direction of the steered wheels.

* * * * *